Patented Aug. 22, 1939

2,170,713

UNITED STATES PATENT OFFICE 2,170,713

STOCK FOOD AND METHOD OF PRODUCING THE SAME

Hans Fattinger, Stadl, at St. Ruprecht on the Raab, Styria, Austria

No Drawing. Application August 10, 1937, Serial No. 158,314. In Austria November 12, 1936

13 Claims. (Cl. 99—6)

In the production of beet sugar, it is the usual practice to purify the sugar solution resulting from the extraction of the beet chips with hot water, by the application of lime and carbon dioxide together with decolorizing sulphur compounds. The use of the lime followed by that of carbon dioxide is termed carbonation. The temperature at which the carbonation is carried on is from approximately 80° to approximately 90° C. This process of adding lime, then charging with carbon dioxide gas is repeated two or three times, depending upon the quality of the juice, but after the first treatment the juice is filtered each time before repeating the carbonation. Before filtering the juice, it is allowed to settle so that the impurities may collect at the bottom of the settling tank. The clear liquid is drawn off and filtered by gravity through bags. That portion of the solution containing the bulk of impurities is also filtered through bags, which are placed in a filter press and much of the liquid is removed.

Considerable thought has been given to the utilization of the sediment and press cake resulting from the carbonation procedure, such material being present in large quantities as a waste product in the normal operations of beet sugar factories.

Thus, it has been proposed that this residue be returned to the beet field and used as a fertilizer; but since the residue has been found to be high in nutritional materials, such as albumin, pectin substances, and organic acids of high food value, as well as a high content of calcium phosphate, the said residue has been considered of possible use as a stock feed.

This material, however, is open to definite objections as a stock food. One of these objections has been its high content of calcium carbonate, and another is that stock will not feed upon such material.

With the knowledge that the calcium carbonate of this carbonation residue is not a raw mineral calcium carbonate as limestone, etc., but is rather precipitated calcium carbonate with high physiological features, it is suggested that these objections may be overcome by incorporating the said residue in a body of acceptable feed which will mask the smell and taste of the said residue, the mixing of the said residue and acceptable feed being performed by stirring the two together, preferably with the addition of sufficient water to form a crumbly, or granular mash, which is preferably dried to a moisture content of about 10 per cent before it is fed.

Experience has shown, however, that the carbonation residue when thus incorporated in a feed body is too fugitive to maintain its association in the feed, and that as the mixture dries, the sediment, owing to the microscopic fineness of its particles and the lightness in weight thereof, dusts excessively, and produces serious trouble, both in the production of the feed, and in the feeding of the resulting mixture, causing additionally, because of these properties, substantial losses of the residue material as dust.

An important object of the present invention, therefore, is to provide a method whereby this fugitive, dust-like residue material is fixed as a stable component of a feed mix.

A further object of the invention is to produce an improved feed composition wherein the said carbonation residue is present in a stable and acceptable form, whereby advantage may be taken of the inherent nutritive value of the said residue material.

Further objects and advantages of the present invention will become apparent as the description proceeds, and the features of novelty will be pointed out explicitly in the appended claims.

It has already been proposed to render the residue of the production of the raw cane sugar, which is known as black strap molasses, non-hygroscopic, and to make the same preservable, to permit its mixture with animal food, by pulverizing the same to a very fine powder, to which a non-hygroscopic inorganic substance such as calcium carbonate or limestone in fine powder form is added, and thoroughly mixed therewith. However, these inorganic substances do not produce food products with high physiological actions, and the method for producing the same is very time-taking and expensive in view of the fact that drying and agitating apparatus is necessary.

In accordance with the present invention, the said carbonation residue from the manufacture of beet sugar, hence the ooze with a high content of nutritious materials, in addition to the important calcium phosphate, is formed into a suitable emulsion with molasses or syrup, the latter being preferably added before incorporation thereof with the carbonation residue. The molasses or syrup employed may be produced from the manufacture of either beet sugar, cane sugar, or wood sugar and the emulsion obtained is in an extremely finely-divided state if the carbonization sediment is intimately combined with heated molasses or syrup. The addition of the molasses or syrup has the further effect of reducing the viscous consistency of the carbonization sediment.

The combination of molasses or syrup with the carbonation residue gives the advantage that the heavy consistency of the residue which hinders considerably the mechanical preparation has been entirely eliminated, and the drying of the residue connected with the molasses as well as the other food products or bases is considerably facilitated. The hygroscopicity and stickiness of the molasses or syrup is also eliminated, and preservation and transportability of the food product is obtained. Finally, the combination of the carbonation residue and molasses, produces a highly digestive value of the proteins in the ready food product. This is probably due to a chemical reaction between the components of the residue and the molasses.

The base or carrier materials become quickly impregnated with the residue emulsion, and rapid drying of the resulting mixture takes place. It will be noted that the process of impregnating the base feeding material with the said emulsion possesses the important economical advantage that there is obtained in one single operation a stock feed of exceptionally high nutritive value, which is rich in albumin and pectin, and which, at the same time, contains calcium phosphate, calcium carbonate, and also sugar, without any requirement of the use of special mechanical devices for accomplishing the production of the finished product.

It is found in practice that the finished feed may be scattered without the loss of its sediment component, and it possesses superior quality and easier assimilation than has been obtained heretofore with feeds which have been prepared with the carbonation residue or sediment, as has been mentioned previously in this description; and the resulting product has been demonstrated in practice to be very wholesome and easily digestible, and the product is produced with a very substantial reduction in cost and time.

The present invention, in other words, makes possible the complete utilization of all organic and mineral nutritive substances of the sugar beet, which are produced regularly in beet sugar manufacture, as well as of the lime used for sedimentation in such operations, the process being a single simple and self-contained production of a high-grade stock feed.

The feed produced by the present process also may be added to the usual feed.

What is claimed is:

1. The method for the production of stock feed comprising acting upon a base feeding material with an emulsion that is formed by the admixture of the carbonation sediment from sugar manufacture and one of the group consisting of molasses and syrup from beet and cane sugar manufacture and wood sugar.

2. The method for the production of stock feed comprising acting upon a base feeding material with an admixture of the carbonation sediment from sugar manufacture and a sugar of a character that will form an emulsion with the sediment.

3. The method for the production of stock feed comprising forming an emulsion of the separated carbonation sediment from sugar manufacture and one of the group consisting of molasses and syrup from beet and cane sugar manufacture and wood sugar, and causing the warmed emulsion to act in loose but intimate mixture upon a base feeding material.

4. The method which comprises admixing the carbonation sediment from sugar manufacture and a sugar of a character that will form an emulsion with the sediment.

5. The process of claim 4 in which the sugar is selected from the group consisting of molasses and syrup from beet sugar and cane sugar manufacture and wood sugar.

6. As a new product, a stock food ingredient comprising an admixture of the carbonation sediment from sugar manufacture and molasses or syrup from beet sugar and cane sugar manufacture, all in the form in an emulsion.

7. A substantially non-dusting stock food comprising a base feeding material impregnated with an emulsion of the carbonation sediment from sugar manufacture and molasses or syrup from beet sugar and cane sugar manufacture.

8. The process for producing stock feed of high nutrient value, which comprises preparing an emulsion of nutrient carbonation residue with a sucrose-containing fluid from sugar manufacture, and impregnating a base food material therewith.

9. Stock feed comprising a base food material of the class described impregnated with an emulsion of carbonation residue from sugar manufacture and a high sucrose-containing material selected from the class of molasses and syrup.

10. A stock feed comprising a base feeding material impregnated with an emulsion of carbonation residue from beet sugar manufacture in molasses.

11. A dry, substantially non-dusting stock feed comprising a base feeding material impregnated with a dried molasses emulsion of carbonation residue from beet sugar manufacture.

12. A dry, substantially non-dusting stock feed comprising a base feeding material impregnated with an emulsion of carbonation residue from sugar production with a sucrose-bearing fluid selected from the class consisting of molasses and syrup resulting from sugar manufacture, the said emulsion being bonded to the base material.

13. A dry, substantially non-dusting stock feed comprising a base feeding material impregnated with a dried emulsion of carbonation residue from sugar manufacture in a sugar-containing vehicle selected from the class consisting of molasses and syrup.

HANS FATTINGER.